United States Patent Office 3,705,216
Patented Dec. 5, 1972

3,705,216
PREPARATION OF TRIVALENT AND PENTA-
VALENT THIOESTERS OF PHOSPHORUS
Charles Edward Farley, Stamford, Conn., assignor to
American Cyanamid Company, Stamford, Conn.
No Drawing. Continuation-in-part of application Ser. No.
575,521, Aug. 29, 1966. This application Dec. 22, 1969,
Ser. No. 887,410
Int. Cl. C07f 9/28
U.S. Cl. 260—970        7 Claims ABSTRACT OF THE DISCLOSURE
Organophosphorus thioesters of the formula

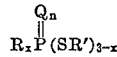

where R and R' are alkyl, cycloalkyl, or aryl, Q is oxygen or sulfur, $n$ is 0 or 1, and $x$ is 0, 1, or 2 are prepared by reacting a phosphine of the formula

with a disulfide of the formula

R'SSR' in an aqueous or a non-aqueous medium and in the presence or absence of a radical inhibitor.

---

This application is a continuation-in-part of Ser. No. 575,521 filed Aug. 29, 1966, now abandoned, and relates to the preparation of organophosphorus thioesters.

More particularly, this invention relates to a convenient essentially single step process for preparing organophosphorus thioesters of the formula

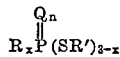

by the reaction of a phosphine of the formula

with a disulfide of the formula

R'SSR' where Q is an oxygen or sulfur atom, $n$ is 0 or 1, $x$ is 0, 1, or 2, and R and R' are alkyl, substituted alkyl, aryl, substituted aryl, or cycloalkyl.

The R and R' alkyl, substituted alkyl, aryl, substituted aryl, or cycloalkyl groups are selected so that they do not enter the reaction. Typically, the alkyl groups may contain from 1 to 18 or more carbon atoms whether straight or branched chain. Typical substituents for alkyl are lower alkoxy, phenyl, cyano, and carboalkoxy (—COOR where R is alkyl $C_1$–$C_{18}$ inclusive) and typical substituents for aryl are lower alkyl, lower alkoxy, di-(loweralkyl)amino, halogen, cyano, and carboalkoxy (—COOR where R is alkyl $C_1$–$C_{18}$). The cycloalkyl groups may contain from 5 to 12 carbon atoms inclusive. Typical of such groups are cyclopentyl, cyclohexyl, cycloheptyl, and cyclooctyl.

The substituents mentioned for alkyl and aryl are those which do not interfere with or enter into the reaction, i.e., are inert under the conditions of the reaction for preparing the organophosphorus thioesters. It will be apparent that a great variety of other such inert substituents are equivalent to those expressly named.

It will be apparent also that R and R' may be the same or different and where more than one of R and R' occurs in the product, each of the R or R' groups may be the same or different. R and R' may therefore vary widely and are limited in a practical sense only by the availability of the phosphine and disulfide reactants and ease of reaction in accordance with the process of the invention.

Among the many primary phosphines within the purview of the instant invention are phenylphosphine, cyclohexylphosphine, benzylphosphine, 2-ethoxyethylphosphine, α-naphthyl phosphine, para-chlorophenylphosphine, methylphosphine, isobutylphosphine, ethylphosphine, n- and isopropylphosphine, n-, iso- and tert.-butylphosphine, pentylphosphine, hexylphosphine, octylphosphine, heptylphosphine, decylphosphine, undecylphosphine, dodecylphosphine, heptadecylphosphine, octadecylphosphine, and the like.

Typical secondary phosphines within the purview of the present invention are dimethylphosphine, dioctylphosphine, didodecylphosphine, diisobutylphosphine, diethylphosphine, bis(trifluoromethyl)phosphine, diphenylphosphine, dibenzylphosphine, bis(2-butoxyethyl)phosphine, bis(para-chlorophenyl)phosphine, bis(para-methylphenyl)phosphine, bis(2-cyanoethyl)phosphine, dicyclohexylphosphine, dicyclopentylphosphine, dioctadecylphosphine, bis(carboethoxyethyl)phosphine, bis(ethoxyphenyl)phosphine, bis(N,N-dimethylaminophenyl)phosphine, bis-(p-cyanophenyl)phosphine, bis(carboethoxyphenyl)phosphine, and the like. It should be noted that the secondary phosphine need not be symmetrical and may include phenylethylphosphine, naphthylbutylphosphine and others.

As typical of disulfide reactants may be mentioned n-butyl disulfide, phenyl disulfide, p-tolyl disulfide, 2-carboethoxyethyl disulfide, cyanoethyl disulfide, ethoxyphenyl disulfide, N,N-dimethylaminophenyl disulfide, p-chlorophenyl disulfide, p-cyanophenyl disulfide, carboethoxyphenyl disulfide, and the like, including unsymmetrical disulfides.

The invention is illustrated by Equations A through D below:

(A) 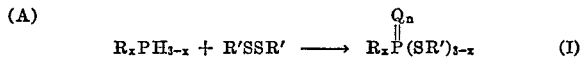

(B) 

(C) 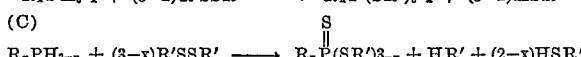

(D) 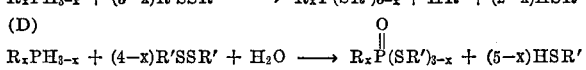

Equation A generically illustrates the process and Equations B, C and D illustrate species thereof. By suitable choice of reactants, mole ratios, reaction medium, and radical inhibitor (if required), a wide variety of thioesters may be prepared, containing either trivalent or pentavalent phosphorus.

Thus, according to the process of Equation B, the trivalent phosphorus thioester is formed simply by heating the reactants in the stoichiometric ratios shown in an inert reaction medium until reaction is essentially complete. The product is formed in an aqueous, partially aqueous, or non-aqueous medium and whether or not a radical inhibitor is present. However, for higher yields it is preferred to employ a radical inhibitor since in the absence of an inhibitor some of the pentavalent phosphorus thioester product of Equation C will also be formed.

The product of Equation C is therefore formed under substantially the same conditions as in Equation B except that no radical inhibitor is employed. An inhibitor would stop sulfur abstraction such that essentially only the trivalent phosphorus thioester product of Equation B would result. In the reaction of Equation C, the alkyl or substituted alkyl disulfides are preferred. The reaction medium may be aqueous, non-aqueous or a mixture of water and a non-aqueous solvent but if an aqueous or partially aqueous medium is employed, care should be taken to avoid more than the stoichiometric amount of disulfide required to form the pentavalent phosphorus thioester since more than 3–x moles of disulfide per mole of phosphine reactant will cause formation of pentavalent phosphorus thiolate ester as illustrated in Equation D. A non-aqueous medium is preferred.

Equation D illustrates preparation of the pentavalent phosphoryl (P=O) thioester corresponding to the pentavalent thiono (P=S) thioester product of Equation C. The essential conditions for the process of Equation D are an aqueous reaction medium (water alone or in admixture with water-miscible or immiscible solvents) and at least 4−x moles of disulfide per mole of phosphine reactant. A radical inhibitor is not essential but may be employed if desired. The aryl or substituted aryl disulfides are preferred as reactants.

The radical inhibitors may be any of the wide variety of reagents useful for this purpose. Common inhibitors are nitriles, quinones, and polycyclic aromatic hydrocarbons. Typical examples are benzoquinone, hydroquinone, and tertiary butyl catechol. The radical inhibitors are employed in minor amounts, e.g., in the range of from about 0.01% to 1.0% based on the weight of reactants. It is preferred to carry out the process of the invention in an inert atmosphere such as argon, nitrogen, or the like.

Reaction is generally conducted until completion. From about 30 minutes to about 24 hours, preferably from about 1 to 5 hours, will be effective under reflux conditions. Reflux temperature, of course, will depend upon choice of solvent medium and reaction pressure. Generally, at atmospheric pressure, temperatures of from about 0° C. to 150° C. are convenient but given suitable apparatus, reaction may be effected at lower temperatures, e.g., −50° C. However, the reactions may be carried out under sub-atmospheric or super-atmospheric conditions and the sequence of addition of reactants is not critical. The reaction may be batch, semi-continuous or continuous. An excess of either reactant over the stoichiometric amount may be employed except as described above. As solvents useful in the process in the invention may be mentioned inert hydrocarbon solvents such as benzene, toluene, xylene, hexane, and heptane; ethers such as dimethyl ether, diethyl ether, 1,2-dimethoxyethane, dimethyl ether of diethylene glycol, dioxane, and water-miscible or immiscible solvents such as tertiary butyl alcohol, glycol ethers, and the like.

In some cases, such as the process of Equation C, it is advantageous to employ radical initiation, for example, where the substituents on alkyl and aryl of R and R′ are electronegative, to improve reaction rate. Acceleration may be achieved by any of the well known methods such as ultraviolet irradiation, X-ray irradiation, or by the addition of conventional initiation reagents, e.g., azo compounds such as azobis(isobutyronitrile), peroxides such as lauroyl peroxide, or persulfates such as potassium persulfate, and the like.

Although cleavage of disulfides with tertiary phosphines or secondary phosphine oxides is known, see Walling et al., J. Am. Chem. Soc., 82, 2181 (1960), the products formed with phosphine, primary phosphines, or secondary phosphines are not predictable due to the great variety of possible products. For example, it might be expected that the reaction of a disulfide, R′SSR′, with a secondary phosphine, R₂PH, would give

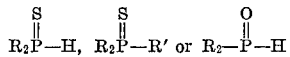

In fact, in the presence of a radical inhibitor, the product is R₂PSR′ (Equation B above). The reason for the great variety of possible products, of course, is the presence of at least one active hydrogen atom on the starting phosphine.

Moreover, so far as is known, the process of the invention is the first example of direct production of thioesters from phosphines. Conventionally, thioesters are made by transesterification or by cumbersome multi-step processes such as the reaction of tetraalkyl lead with phosphorus trichloride to give RPCl₂, followed by a reaction with a mercaptan in the presence of base to give the trivalent phosphorus thioester and, further, reaction with sulfur to give the pentavalent phosphorus thioester. Thioesters, in any event, cannot be made from tertiary phosphines and disulfides. In such a reaction a tertiary phosphine sulfide is formed in a non-aqueous reaction medium or a tertiary phosphine oxide is formed in an aqueous reaction medium.

The advantages of the invention therefore include a convenient direct route to a great variety of thioesters, the practicality of employing a non-aqeuous system and therefore avoiding the water-sensitivity of some groups, and preparation of products from readily available reagents.

The thioester products of the process of the invention have many uses as will be obvious to those skilled in the art. For example, the thioesters are useful in minor amounts, e.g., 0.01% to 5% by weight, as extreme pressure lubricating oil additives, and as intermediates in the preparation of insecticides and froth flotation agents.

The following examples further illustrate the invention but are not limitative thereof except as indicated in the appended claims. All parts and percentages are by weight unless otherwise specified.

Examples 1–16 illustrate the reaction of Equation B wherein x is 2:

(B)  $R_2PH + R'SSR' \rightarrow R_2PSR' + R'SH$

EXAMPLE 1

Phenyl dicyclohexylphosphinothioite

Phenyl disulfide (11.0 grams, 0.050 mole), dicyclohexylphosphine (10.0 grams, 0.050 mole) and 0.05 gram hydroquinone were refluxed for 2.25 hours in 100 milliliters of benzene under an atmosphere of argon. Vacuum distillation gave 14.3 grams (92%) product of B.P. 175–179° C./0.1 millimeter. The infrared spectrum was consistent with the proposed structure (P—S at 512 cm.⁻¹).

Calcd. for $C_{18}H_{27}PS$ (percent): C, 70.62; H, 8.87; P, 10.09; S, 10.42. Found (percent): C, 70.54; H, 9.19; P, 10.24; S, 10.70.

This compound was also prepared in 83% yield in 80/20 t-butanol-water.

The table below shows conditions for preparation of other phosphinothioites from secondary phosphines except that longer reaction times were allowed for alkyl disulfides than for aryl disulfides.

TABLE.—PHOSPHINOTHIOITE ESTERS

| Example | R | R′ | B.P.,°/mm. | Yield, percent | Calcd. C | H | P | S | Found C | H | P | S |
|---|---|---|---|---|---|---|---|---|---|---|---|---|
| 2 | Iso-C₄H₉ | n-C₄H₉ | 156–166/0.17 | 91 | 61.42 | 11.60 | 13.11 | 13.67 | 61.28 | 12.20 | 13.07 | 13.3 |
| 3 | Cyclo-C₆H₁₁ | n-C₄H₉ | 126–133/0.15 | ¹52 | 67.03 | 10.90 | 10.82 | 11.18 | 66.87 | 10.86 | 10.53 | 11.4 |
| 4 | Iso-C₄H₉ | p-CH₃C₆H₄ | 110–115/0.17 | 81 | 67.16 | 9.38 | 11.53 | 11.93 | 67.28 | 9.42 | 11.67 | 12.02 |
| 5 | Iso-C₄H₉ | C₆H₅ | 94–98/0.12 | 93 | 66.11 | 9.11 | 12.17 | 12.61 | 66.14 | 9.19 | 12.07 | 12.97 |
| 6 | Iso-C₄H₉ | C₂H₅O₂CCH₂CH₂ | 123–128/0.18 | 87 | 56.08 | 9.78 | 11.12 | 11.52 | 56.27 | 9.52 | 10.21 | 11.67 |

¹ A small amount of higher boiling material containing P=S was also observed.

Examples 7–9 illustrate the reaction of Equation B wherein $x$ is 1:

(B) $\quad RPH_2 + 2R'SSR' \rightarrow RP(SR')_2 + 2HSR'$

EXAMPLE 7

Diphenyl cyclohexylphosphorodithioite

Phenyl disulfide (53.2 grams, 0.245 mole) and cyclohexylphosphine (14.0 grams, 0.121 mole) were refluxed for 20 hours in 125 milliliters benzene under argon. Vacuum distillation gave 36.0 grams (90%) product, B.P. 183–189° C./0.15 millimeter. The infrared spectrum was consistent with the proposed structure (P—S at 503 cm.$^{-1}$).

Calcd. for $C_{18}H_{21}PS_2$ (percent): C, 65.28; H, 6.37; P, 9.32; S, 19.29. Found (percent): C, 65.14; H, 6.43; P, 9.27; S, 18.97.

EXAMPLE 8

Diphenyl n-butylphosphorodithioite

Phenyl disulfide (96.0 grams, 0.44 mole) and n-butylphosphine (20.0 grams, 0.22 mole) was refluxed for 16 hours in 125 milliliters of benzene under argon. Vacuum distillation gave 63.1 grams (93%) product of B.P. 175–180° C./0.30 millimeter.

Calcd. for $C_{16}H_{19}PS_2$ (percent): C, 62.68; H, 6.24; P, 10.11; S, 20.94. Found (percent): C, 62.85; H, 6.27; P, 10.11; S, 20.13.

EXAMPLE 9

Di-n-butyl n-butylphosphorodithioite n-Butyldisulfide (48.0 grams, 0.27 mole), n-butylphosphine (13.5 grams, 0.15 mole) and 1.1 grams hydroquinone were refluxed for 30 hours in 70 milliliters benzene under argon. Vacuum distillation gave 8.2 grams (23%) product of B.P. 96–110° C./0.25 millimeter. The absorption band for P—S in the infrared was present at 497 cm.$^{-1}$.

Calcd. for $C_{12}H_{27}PS_2$ (percent): C, 54.08; H, 10.20; P, 11.62; S, 24.10. Found (percent): C, 52.72; H, 9.90; P, 11.59; S, 24.74.

A 3.8 grams fraction of slightly higher B.P. was also obtained which contained some trithioate ester (P=S, 678 cm.$^{-1}$; 27.36% S).

Examples 10–12 illustrate the reaction of Equation C wherein $x$ is 2:

(C) 

EXAMPLE 10 n-Butyl dicyclohexylphosphinodithioate n-Butyl disulfide (12.5 grams, 0.070 mole) and dicyclohexylphosphine (13.2 grams, 0.067 mole) were refluxed for 20 hours in 50 milliliters benzene under argon. Vacuum distillation gave 19.0 grams (90%) product of B.P. 167–175° C./0.15 millimeter. The infrared spectrum was consistent with the proposed structure (P—S at 521 and P=S at 638 cm.$^{-1}$).

Calcd. for $C_{16}H_{31}PS_2$ (percent): C, 60.30; H, 9.81; P, 9.47; S, 20.11. Found (percent): C, 61.02; H, 10.07; P, 9.75; S, 19.78.

EXAMPLE 11 n-Butyl diisobutylphosphinodithioate n-Butyl disulfide (26.7 grams, 0.15 mole) and diisobutylphosphine (17.2 grams, 0.12 mole) were refluxed for 16 hours in 150 milliliters benzene under argon. The gases evolved during reaction were collected over water. Mass spectrometry indicated over 95% butane was present. Vacuum distillation gave 30.4 grams (97%) product by B.P. 97–104° C./0.05 millimeter.

Calcd. for $C_{12}H_{27}PS_2$ (percent): C, 54.10; H, 10.42; P, 11.63; S, 22.02. Found (percent): C, 54.71; H, 10.30; P, 11.71; S, 22.84.

EXAMPLE 12

2-carbethoxyethyl diisobutylphosphinodithioate 2-carbethoxyethyl disulfide (24.0 grams, 0.09 mole), diisobutylphosphine (14.6 grams, 0.10 mole) and as initiator, 0.2 gram azobis(isobutyronitrile), hereinafter "AIBN," were refluxed for 62 hours in 100 milliliters benzene under argon. An additional 0.2 gram AIBN was added and reflux was continued another 5 hours. Vacuum distillation gave 18.6 grams (67%) product of B.P. 152–157° C./0.20 millimeter.

Calcd. for $C_{13}H_{27}PS_2O_2$ (percent): C, 50.26; H, 8.76; P, 9.98; S, 20.64. Found (percent): C, 51.59; H, 8.80; P, 10.24; S, 18.35.

Example 13 illustrates the reaction of Equation C wherein $x$ is 1:

(C) 

EXAMPLE 13

Di-n-butyl n-butylphosphorotrithioate n-Butyl disulfide (37.1 grams, 0.21 mole), and n-butylphosphine (9.9 grams, 0.11 mole) were refluxed for 67 hours in 75 milliliters benzene under argon. AIBN was added at 2, 35 and 65 hours in 0.1 gram portions. Vacuum distillation gave 24.3 grams (87%) product of B.P. 138–144° C./0.17 millimeter. The infrared spectrum was consistent with the proposed structure (P—S at 527 and P=S at 638 cm.$^{-1}$).

Calcd. for $C_{12}H_{27}PS_3$ (percent): C, 48.30; H, 9.12; P, 10.38; S, 32.20. Found (percent): C, 47.88; H, 8.76; P, 10.36; S. 31.37.

Example 14 illustrates the reaction of Equation D wherein $x$ is 2:

(D) 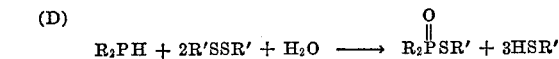

EXAMPLE 14

Phenyl dicyclohexylphosphinothiolate

Phenyl disulfide (22.0 grams, 0.10 mole), dicyclohexylphosphine (10.0 grams, 0.05 mole) were refluxed for 64 hours in 600 milliliters 80/20 t-butanol-water. The solvent was removed by vacuum distillation and the residue was crystallized from petroleum ether. The yield of white solid was 14.4 grams (90%) of M.P. 84–90.5° C. A second crystallization gave M.P. 91–93° C. (lit. M.P. 91–93.5° C.). A mixture melting point with an independently prepared sample gave no depression.

Calcd. for $C_{18}H_{27}PSO$ (percent): P, 9.61; S, 9.94. Found (percent): P, 9.56; S, 9.91.

EXAMPLE 15

The product of Example 14 was also prepared (M.P. 91.5–93° C.) in 92% yiled by reaction of phenyl disulfide and phenyl dicyclohexylphosphinothioite under substantially the same conditions as Example 14:

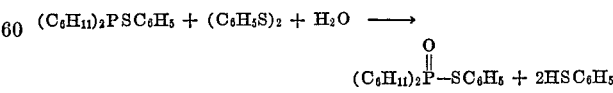

EXAMPLE 16

To a stainless steel autoclave is charged n-btuyldisulfide (53.5 grams, 0.3 mole), about 150 milliliters of benzene, and 1 gram of hydroquinone. Phosphine (3.4 grams, 0.1 mole) is then pumped into the autoclave and the mixture is reacted at about 80° C. to 100° C. for about 30 hours. The reaction mixture is then cooled and vacuum distilled to give tri-n-butylphosphorotrithioite. The corresponding pentavalent phosphorus thioester, $S=P(SC_4H_{9-n})_3$, is prepared in essentially the same manner except that no inhibitor is employed. The corresponding pentavalent thiolate ester, $O=P(SC_4H_{9-n})_3$, results when the benzene

I claim:

1. A process for preparing organophosphorus thioesters of the formula $$R_xP(SR')_{3-x}^{Q_n}$$

which comprises reacting a phosphine of the formula $$R_xPH_{3-x}$$

with a disulfide of the formula

R'SSR' where Q is oxygen or sulfur, $n$ is 0 or 1, $x$ is 0, 1, or 2, and R and R' are alkyl, aryl, or cycloalkyl, and do not enter into the reaction, provided that when $n$ is 0 a radical inhibitor is present and provided that when Q is oxygen the reaction mixture is aqueous and at least $4-x$ moles of disulfide are present per mole of phosphine.

2. A process for preparing organophosphorus thioesters of the formula $$R_xP(SR')_{3-x}^{Q_n}$$

which comprises reacting a phosphine of the formula $$R_xPH_{3-x}$$

with a disulfide of the formula

R'SSR' where Q is oxygen or sulfur, $n$ is 0 or 1, $x$ is 0, 1, or 2, and R and R' are $C_1$–$C_{18}$ alkyl and substituted alkyl, $C_5$–$C_{12}$ cycloalkyl, or aryl and substituted aryl, and do not enter into the reaction, provided that when $n$ is 0 a radical inhibitor is present and provided that when Q is oxygen the reaction mixture is aqeuous and at least $4-x$ moles of disulfide are present per mole of phosphine.

3. The process of claim 2 wherein a radical inhibitor is present whereby there is formed a thioester of the formula $$R_xP(SR')_{3-x}$$

wherein R, R' and $x$ are as defined in claim 2.

4. The process of claim 3 wherein the reaction medium is non-aqueous.

5. The process of claim 2 wherein at least $4-x$ moles of disulfide are present per mole of phosphine and the reaction medium is aqueous, whereby there is formed a thioester of the formula $$R_xP(SR')_{3-x}^{\parallel O}$$

wherein R, R' and $x$ are as defined in claim 2.

6. The process of claim 2 wherein no radical inhibitor is present, whereby there is formed a thioester of the formula $$R_xP(SR')_{3-x}^{\parallel S}$$

wherein R, R' and $x$ are as defined in claim 2.

7. A process for preparing organophosphorus thioesters of the formula $$R_xP(SR')_{3-x}^{Q_n}$$

which comprises reacting a phosphine of the formula $$R_xPH_{3-x}$$

with a disulfide of the formula

R'SSR' where Q is oxygen or sulfur, $n$ is 0 or 1, $x$ is 0, 1, or 2, and R and R' are $C_1$–$C_{18}$ alkyl and substituted alkyl, phenylbenzyl, naphthyl and substituted phenyl, benzyl and naphthyl or $C_5$–$C_{12}$ cycloalkyl, and do not enter into the reaction, provided when R and R' are alkyl, the substituent groups may be lower alkoxy, phenyl, cyano and carboloweralkoxy, and when R and R' are aryl, the substituent groups may be lower alkyl, lower alkoxy, di (lower alkyl) amino, halogen, cyano, and carboloweralkoxy, provided that when $n$ is 0 a radical inhibitor is present and provided further that when Q is oxygen the reaction mixture is aqueous and at least $4-x$ moles of disulfide are present per mole of phosphine.

No references cited.

LEWIS GOTTS, Primary Examiner

A. H. SUTTO, Assistant Examiner

U.S. Cl. X.R.

252—46.6, 46.7; 260— 606.5 P, 608, 940, 941, 950, 951, 945, 958, 961, 963

UNITED STATES PATENT OFFICE
CERTIFICATE OF CORRECTION

Patent No. 3,705,216        Dated December 5, 1972

Inventor(s) CHARLES EDWARD FARLEY

It is certified that error appears in the above-identified patent and that said Letters Patent are hereby corrected as shown below:

Column 4, line 41, cancel "1-16" and substitute -- 1-6 -- .

Column 4, Table-Phosphinothioite Esters, Example 2, under S, cancel "13.3" and substitute -- 13.34 -- .

Column 4, Table-Phosphinothioite Esters, Example 3, under S, cancel "11.4" and substitute -- 11.48 -- .

Column 5, line 72, cancel "104°C. and substitute -- 103°C. -- .

Column 6, line 56, cancel "yiled" and substitute -- yield -- .

Column 7, Claim 1, line 13 following "a disulfide of the formula" insert -- R'SSR' -- .

Signed and sealed this 8th day of May 1973.

(SEAL)
Attest:

EDWARD M. FLETCHER, JR.        ROBERT GOTTSCHALK
Attesting Officer              Commissioner of Patents